(12) United States Patent
Qu et al.

(10) Patent No.: US 11,859,840 B2
(45) Date of Patent: Jan. 2, 2024

(54) PHOTOVOLTAIC AIR CONDITIONING SYSTEM STARTUP METHOD, CONTROLLER AND PHOTOVOLTAIC AIR CONDITIONING SYSTEM

(71) Applicant: GREE ELECTRIC APPLIANCES, INC. OF ZHUHAI, Zhuhai (CN)

(72) Inventors: Dongrui Qu, Zhuhai (CN); Ningning Chen, Zhuhai (CN); Wu Wen, Zhuhai (CN); Xianqiao Yu, Zhuhai (CN); Zunhui Xiao, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 141 days.

(21) Appl. No.: 17/435,948

(22) PCT Filed: Jul. 8, 2020

(86) PCT No.: PCT/CN2020/100880
§ 371 (c)(1),
(2) Date: Sep. 2, 2021

(87) PCT Pub. No.: WO2021/057178
PCT Pub. Date: Apr. 1, 2021

(65) Prior Publication Data
US 2022/0136721 A1     May 5, 2022

(30) Foreign Application Priority Data

Sep. 26, 2019   (CN) .......................... 201910914738.1

(51) Int. Cl.
*F24F 11/46* (2018.01)
*F24F 11/88* (2018.01)
(Continued)

(52) U.S. Cl.
CPC .............. *F24F 11/46* (2018.01); *F24F 11/49* (2018.01); *F24F 11/88* (2018.01); *H02J 3/38* (2013.01);
(Continued)

(58) Field of Classification Search
CPC .. F24F 11/46; F24F 11/49; F24F 11/88; F24F 2005/0067; H02J 3/38; H02J 2300/24; H02J 2310/14; H02J 1/102; H02J 3/381
See application file for complete search history.

(56) References Cited

U.S. PATENT DOCUMENTS

2007/0051334 A1\* 3/2007 Juenemann ............. F02N 11/10
   123/179.3
2015/0168473 A1\* 6/2015 Fornage .................. H02S 50/00
   324/509
(Continued)

FOREIGN PATENT DOCUMENTS

CN     101876472 A     11/2010
CN     104319761 A     1/2015
(Continued)

OTHER PUBLICATIONS

International Search Report dated Sep. 30, 2020 in PCT/CN2020/100880 filed Jul. 8, 2020, 3 pages.
(Continued)

*Primary Examiner* — Charles Cai
(74) *Attorney, Agent, or Firm* — Oblon, McClelland, Maier & Neustadt, L.L.P.

(57) ABSTRACT

A photovoltaic air conditioning system startup method, a controller, and a photovoltaic air conditioning system. The photovoltaic air conditioning system starting method includes: when a photovoltaic device meets a preset power generation condition, controlling a bidirectional converter to enter an operating state; and when the bidirectional con-
(Continued)

verter enters the operating state, controlling a direct current-direct current converter connected to the photovoltaic device to enter an operating state, so that the photovoltaic device provides electric energy to an air-conditioning device by means of the direct current-direct current converter.

18 Claims, 4 Drawing Sheets

(51) Int. Cl.
*F24F 11/49* (2018.01)
*H02J 3/38* (2006.01)

(52) U.S. Cl.
CPC ....... *H02J 2300/24* (2020.01); *H02J 2310/14* (2020.01)

(56) References Cited

U.S. PATENT DOCUMENTS

| | | | | |
|---|---|---|---|---|
| 2015/0288189 | A1* | 10/2015 | Nakai | H02J 7/35 307/26 |
| 2017/0366023 | A1* | 12/2017 | Tanaka | H01M 10/425 |

FOREIGN PATENT DOCUMENTS

| | | | |
|---|---|---|---|
| CN | 104728998 A | | 6/2015 |
| CN | 105450039 A | * | 3/2016 |
| CN | 105450039 A | | 3/2016 |
| CN | 206542242 U | | 10/2017 |
| CN | 109167392 A | | 1/2019 |
| CN | 109347140 A | | 2/2019 |
| CN | 110460105 A | | 11/2019 |
| EP | 3 196 999 B1 | | 6/2020 |
| JP | 2014-90637 A | | 5/2014 |
| JP | 2014-124059 A | | 7/2014 |

OTHER PUBLICATIONS

International Search Report and Written Opinion dated Sep. 30, 2020 in PCT/CN2020/100880 (with English Translation of ISR), 13 pages.

Combined Chinese Office Action and Search Report dated Sep. 3, 2020 in corresponding Chinese Patent Application No. 201910914738.1 (with English Translation), 16 pages.

Combined Chinese Office Action and Search Report dated Jan. 22, 2021 in corresponding Chinese Patent Application No. 201910914738.1 (with English Translation), 7 pages.

* cited by examiner

PHOTOVOLTAIC AIR CONDITIONING SYSTEM STARTUP METHOD, CONTROLLER AND PHOTOVOLTAIC AIR CONDITIONING SYSTEM

CROSS-REFERENCE TO RELATED APPLICATIONS

The present application is a U.S. National Stage Application under 35 U.S.C. § 371 of International Patent Application No. PCT/CN2020/100880, filed on Jul. 8, 2020, which is based on and claims priority from CN application No. 201910914738.1, filed on Sep. 26, 2019, the disclosure of both of which are hereby incorporated into this disclosure by reference in its entirety.

TECHNICAL FIELD

The disclosure relates to the field of photovoltaic power generation, in particular to a startup method of a photovoltaic air conditioning system, a controller and a photovoltaic air conditioning system.

BACKGROUND

As a renewable energy source, solar energy is one of the main new energy sources and is widely used. In related technologies, an air conditioner is usually powered by mains supply. When the photovoltaic device can generate electricity, the photovoltaic device provides the output electric power to the air conditioner, so that the air conditioner can operate with the electrical energy provided by the photovoltaic device.

SUMMARY

According to a first aspect of the embodiments of the present disclosure, there is provided a startup method of a photovoltaic air conditioning system, comprising: controlling a bidirectional inverter to enter an operating state under a condition that a photovoltaic device meets the preset power generation condition; and controlling a direct current-direct current converter connected with the photovoltaic device to enter an operating state to transmit electric power from the photovoltaic device to an air conditioning device in the photovoltaic air conditioning system under a condition that the bidirectional inverter enters the operating state.

In some embodiments, the controlling the bidirectional inverter to enter the operating state under a condition that the photovoltaic device meets the preset power generation condition comprises: determining whether electrical parameters of the photovoltaic device meet a preset power generation condition under a condition that an outdoor unit of the air conditioning device is in a standby state; setting a startup identifier of the direct current-direct current converter and controlling the bidirectional inverter to enter the operating state under a condition that the electrical parameters of the photovoltaic device meet the preset power generation condition.

In some embodiments, the controlling the bidirectional inverter to enter the operating state under a condition that the photovoltaic device meets the preset power generation condition further comprises: determining whether an indoor unit of the air conditioning device receives a startup instruction under a condition that the electrical parameters of the photovoltaic device do not meet the preset power generation condition; controlling the indoor unit of the air conditioning device to enter an operating state and controlling the bidirectional inverter to enter the operating state under a condition that the indoor unit of the air conditioning device receives the startup instruction.

In some embodiments, the controlling the bidirectional inverter to enter the operating state comprises: sending a first control signal to the bidirectional inverter to startup the bidirectional inverter.

In some embodiments, the controlling the direct current-direct current converter connected with the photovoltaic device to enter the operating state under a condition that the bidirectional inverter enters the operating state comprises: detecting whether there is a startup identifier of the direct current-direct current converter under a condition that the bidirectional inverter enters the operating state; controlling the direct current-direct current converter to enter the operating state under a condition that there is a startup identifier of the direct current-direct current converter.

In some embodiments, determining whether an indoor unit of the air conditioning device is in a startup state after the bidirectional inverter enters the operating state; controlling an outdoor unit of the air conditioning device to enter the operating state under a condition that the indoor unit of the air conditioning device is in a startup state.

In some embodiments, the controlling the direct current-direct current converter to enter the operating state comprises: sending a second control signal to the direct current-direct current converter to startup the direct current-direct current converter.

In some embodiments, the preset power generation condition comprises that an output voltage of the photovoltaic device is larger than a voltage threshold value, and an insulation impedance of the photovoltaic device is larger than an impedance threshold value.

According to a second aspect of embodiments of the present disclosure, there is provided a controller comprising: an bidirectional inverter control unit, configured to control an bidirectional inverter to enter an operating state under a condition that a photovoltaic device meets a preset power generation condition; a direct current-direct current converter control unit, configured to control a direct current-direct current converter connected with the photovoltaic device to enter an operating state to transmit electric power from the photovoltaic device to an air conditioning device in the photovoltaic air conditioning system under a condition that the bidirectional inverter enters the operating state.

In some embodiments, the preset power generation condition comprises that an output voltage of the photovoltaic device is larger than a voltage threshold value, and an insulation impedance of the photovoltaic device is larger than an impedance threshold value.

According to a third aspect of embodiments of the present disclosure, there is provided a controller comprising: a processor; and a memory coupled to the processor, storing program instructions which, when executed by the processor, cause the processor to: control a bidirectional inverter to enter an operating state under a condition that a photovoltaic device meets the preset power generation condition; and control a direct current-direct current converter connected with the photovoltaic device to enter an operating state under a condition that the bidirectional inverter enters the operating state to transmit electric power from the photovoltaic device to an air conditioning device in the photovoltaic air conditioning system under a condition that the bidirectional inverter enters the operating state.

In some embodiments, the instructions further cause the processor to: determine whether electrical parameters of the photovoltaic device meet a preset power generation condition under a condition that an outdoor unit of the air conditioning device is in a standby state; set a startup identifier of the direct current-direct current converter and control the bidirectional inverter to enter the operating state under a condition that the electrical parameters of the photovoltaic device meet the preset power generation condition.

In some embodiments, the instructions further cause the processor to: determine whether an indoor unit of the air conditioning device receives a startup instruction under a condition that the electrical parameters of the photovoltaic device do not meet the preset power generation condition; control the indoor unit of the air conditioning device to enter an operating state and control the bidirectional inverter to enter the operating state under a condition that the indoor unit of the air conditioning device receives the startup instruction.

In some embodiments, the instructions further cause the processor to: send a first control signal to the bidirectional inverter to startup the bidirectional inverter.

In some embodiments, the instructions further cause the processor to: detect whether there is a startup identifier of the direct current-direct current converter under a condition that the bidirectional inverter enters the operating state; control the direct current-direct current converter to enter the operating state under a condition that there is a startup identifier of the direct current-direct current converter.

In some embodiments, the instructions further cause the processor to: determine whether an indoor unit of the air conditioning device is in a startup state after the bidirectional inverter enters the operating state; control an outdoor unit of the air conditioning device to enter the operating state under a condition that the indoor unit of the air conditioning device is in a startup state.

In some embodiments, the instructions further cause the processor to: send a second control signal to the direct current-direct current converter to startup the direct current-direct current converter.

In some embodiments, the preset power generation condition comprises that an output voltage of the photovoltaic device is larger than a voltage threshold value, and an insulation impedance of the photovoltaic device is larger than an impedance threshold value.

According to a fourth aspect of embodiments of the present disclosure, there is provided a photovoltaic air conditioning system comprising: a controller of any of the above embodiments; a photovoltaic device; a direct current-direct current converter and a bidirectional inverter connected with a direct current bus, wherein the direct current-direct current converter is configured to convert a direct current power output by the photovoltaic device into a direct current power transmitted on the direct current bus and send electrical parameters to the controller; an outdoor unit of the air conditioning device, configured to receive electric power from the direct current bus and send a state of the outdoor unit to the controller; and an indoor unit of the air conditioning device, configured to receive electric power from the direct current bus or receive electric power from an alternating current power supply through the bidirectional inverter and send the state of the indoor unit to the controller.

According to a fifth aspect of embodiments of the present disclosure, there is provided a non-transitory computer readable storage medium having stored thereon computer program instructions which, when executed by a processor, implement the startup method of a photovoltaic air conditioning system of any of the above embodiments.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which are incorporated in and constitute a part of this specification, illustrate embodiments of the disclosure and together with the description, serve to explain the principles of the disclosure.

The present disclosure may be more clearly understood from the following detailed description taken in conjunction with the accompanying drawings, in which.

DETAILED DESCRIPTION

Various exemplary embodiments of the present disclosure will now be described in detail with reference to the accompanying drawings. It should be noted that the relative arrangement of parts and steps, numerical expressions and numerical values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

The following description of at least one exemplary embodiment is merely illustrative in nature and is in no way intended to limit the disclosure, its application, or uses.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that similar reference signs and letters refer to similar items in the following figures, and thus, once an item is defined in one figure, it need not be discussed further in subsequent figures.

To make the objects, technical solutions and advantages of the present disclosure more apparent, the present disclosure will be described in further detail below with reference to specific embodiments and the accompanying drawings.

The inventors of the present disclosure found through research that an energy generated by photovoltaic device is greatly influenced by the environmental climate and the connection load. In the related art, the photovoltaic device is usually used as a power generation source, and cannot effectively participate in the startup and operation of the air conditioning system. When the air conditioning system is started, a large amount of energy is instantaneously required. If the generated power of the photovoltaic device is smaller than the power required by the air conditioner, the service life of the photovoltaic device will be damaged, and negative effects can be generated on the air conditioning system.

In view of the above, the present disclosure provides a startup method of a photovoltaic air conditioning system, capable of improving the stability of the system.

Figure 1:
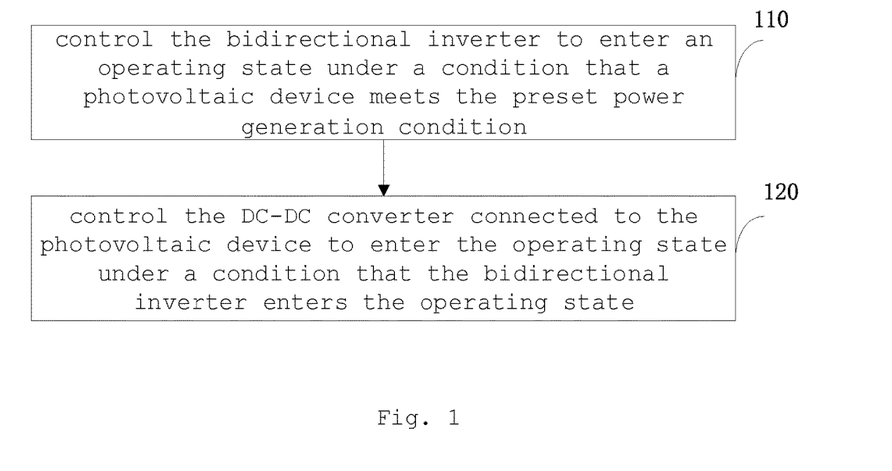
FIG. 1 is a schematic flow diagram of one embodiment of a startup method of a photovoltaic air conditioning system of the present disclosure.

FIG. 1 is a schematic flow diagram of one embodiment of a startup method of a photovoltaic air conditioning system of the present disclosure. In some embodiments, the following startup method is performed by a controller.

In step 110, a bidirectional inverter is controlled to enter an operating state under a condition that a photovoltaic device meets a preset power generation condition.

It should be noted here that an air conditioning system can only be operated after the bidirectional inverter is started.

The bidirectional inverter can convert a direct current (DC) into an alternating current (AC) and also can convert the alternating current into the direct current.

Figure 2:
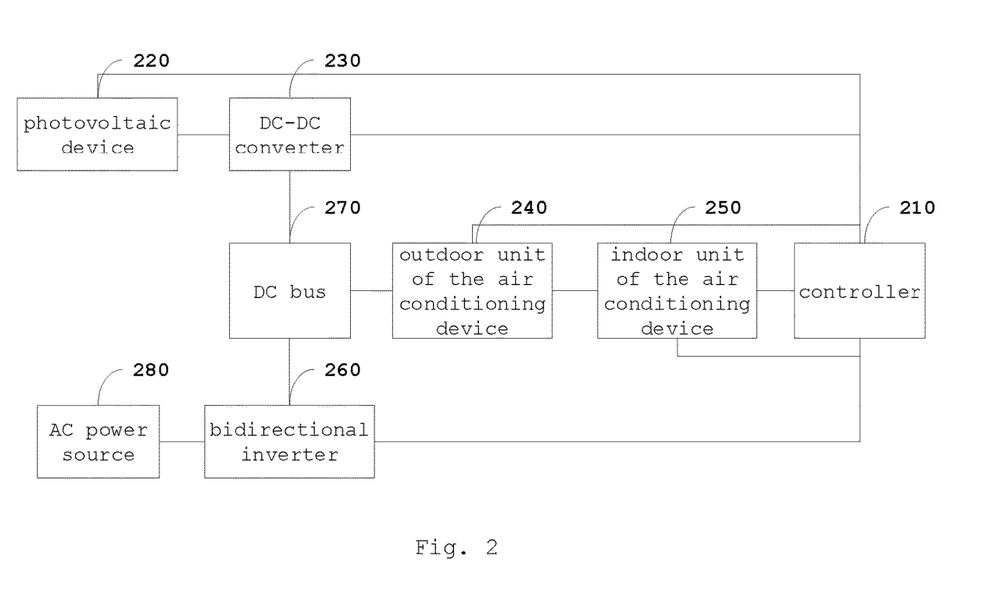
FIG. 2 is a schematic structural diagram of one embodiment of the photovoltaic air conditioning system of the present disclosure.

FIG. 2 is a schematic structural view of one embodiment of the photovoltaic air conditioning system of the present disclosure.

As shown in FIG. 2, the photovoltaic air conditioning system includes a controller 210, a photovoltaic device 220, a DC-DC converter 230, an outdoor unit 240 of the air conditioning device, an indoor unit 250 of the air conditioning device, a bidirectional inverter 260, and a DC bus 270.

The DC side includes a photovoltaic device 220, a DC-DC converter 230, and other auxiliary circuits and structures. The photovoltaic device 220 converts the output DC power into DC power that can be transmitted on the DC bus 270 through the DC-DC converter 230, and sends electrical parameters to the controller 210. The electrical parameters include the open circuit voltage and the insulation impedance of the output of the photovoltaic device 220.

In some embodiments, the photovoltaic device 220 includes a single-path photovoltaic string or a multi-path photovoltaic string. The DC-DC converter 230 is a single DC (Direct Current)/DC circuit, and also be a circuit with a series or parallel function correspondingly. The DC/DC circuit can be a BUCK conversion circuit BUCK, a BOOST conversion circuit BOOST, a flyback circuit, a forward circuit, a half-bridge circuit, a full-bridge circuit and other topologies with the function of converting direct current into direct current or the deformation of corresponding topology circuits.

In some embodiments, the voltage on the DC bus is a fixed DC voltage, or a DC voltage that is within a voltage range.

The outdoor unit 240 of the air conditioning device receives electric power from the DC bus 270 and transmits its own state to the controller 210. The outdoor unit 240 of the air conditioning device is in communication connection with the indoor unit 250 of the air conditioner and the controller 210. In some embodiments, the communication means includes CAN or RS485, etc. The indoor unit 250 of the air conditioning device receives power from the DC bus 270 or power from the AC power source 280 through the bidirectional inverter 260, and transmits its own state to the controller 210. The bidirectional inverter 260 is connected to a DC bus 270.

The AC side includes an AC power supply 280, a bidirectional converter 260, and other auxiliary circuits and structures. In some embodiments, AC power source 280 is an independent power generation source, or a series-parallel combination of multiple power generation sources or multiple power generation devices. The AC power supply 280 is capable of outputting AC power having a particular voltage level and voltage frequency. In some embodiments, the AC power output by AC power supply 280 may be a single phase power supply or a multi-phase power supply. In some embodiments, the AC power source 280 is a respective power generation device, power supply device, or energy storage device.

The bidirectional inverter 260 can convert power of the DC bus into AC power, or convert AC power into power of the DC bus, and in some embodiments, the bidirectional inverter 260 is a single-path DC/AC (Alternating Current) circuit, or a circuit formed by connecting multiple circuits with DC/AC functions in series or in parallel. In some embodiments, the bidirectional inverter 260 circuit is a circuit with DC/AC function such as H bridge, H5, H6 and the like, and other derivative topologies.

In step 120, the DC-DC converter connected to the photovoltaic device is controlled to enter the operating state under a condition that the bidirectional inverter enters the operating state. The photovoltaic device can only supply electric power to the air conditioning device through the DC-DC converter after the DC-DC converter is operated.

In the startup method of the photovoltaic air conditioning system provided by the embodiment of the present disclosure, the bidirectional inverter is controlled to enter the operating state under a condition that the photovoltaic device meets the preset power generation condition, and then the DC-DC converter connected with the photovoltaic device is controlled to enter the operating state, so that the system stability is improved.

Figure 3:
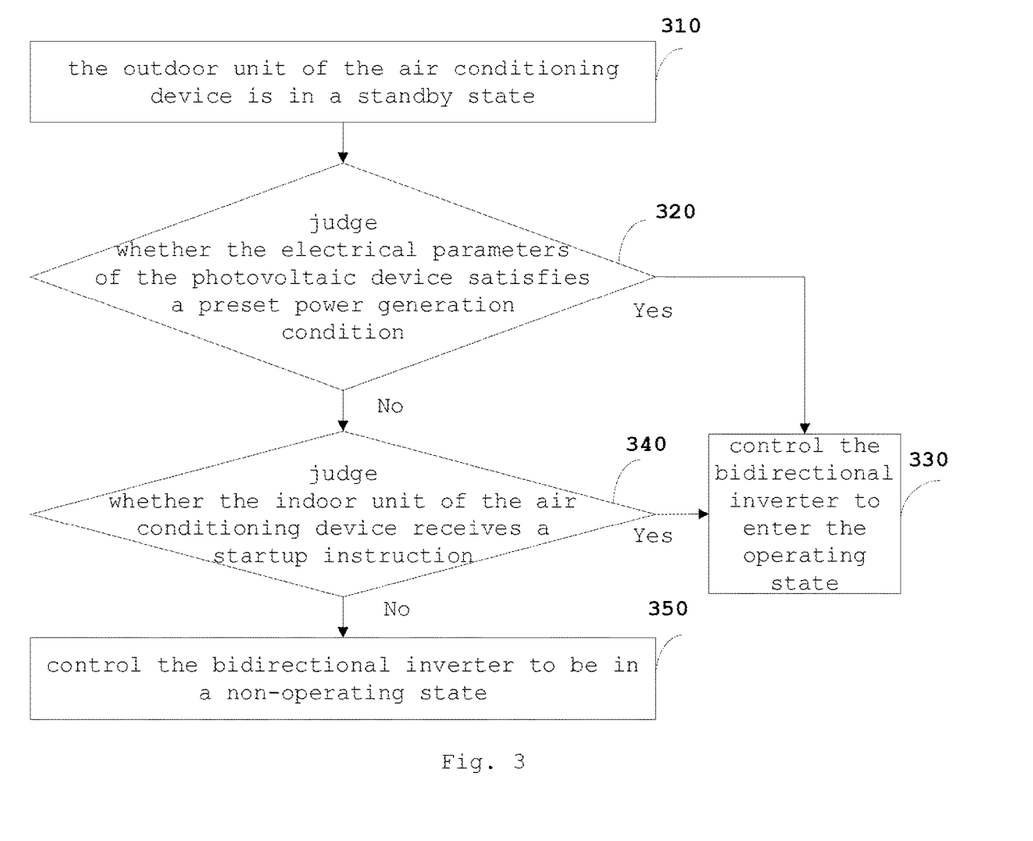
FIG. 3 is a schematic flow diagram illustrating another embodiment of a startup method of the photovoltaic air conditioning system according to the present disclosure.

FIG. 3 is a schematic flow diagram illustrating another embodiment of a startup method of the photovoltaic air conditioning system according to the present disclosure. In some embodiments, the following startup method is performed by a controller.

In step 310, the outdoor unit of the air conditioning device enters a standby state after the photovoltaic air conditioning system is connected to the mains supply. At this time, the bidirectional inverter is in a non-operating state, and the indoor unit of the air conditioning device is in a power-off state.

In step 320, it is determined whether the electrical parameter of the photovoltaic device satisfies a predetermined power generation condition. If the electrical parameters of the photovoltaic device satisfies the predetermined power generation condition, step 330 is executed. Otherwise, step 340 is performed.

In some embodiments, the electrical parameters include output voltage and insulation impedance.

In some embodiments, it is determined that the photovoltaic device satisfies the preset power generation condition under a condition that the output voltage of the photovoltaic device is greater than the voltage threshold and the insulation impedance of the photovoltaic device is greater than the impedance threshold. Otherwise, it is determined that the photovoltaic device does not meet the preset power generation condition. For example, when the open-circuit voltage of the photovoltaic device is greater than or equal to 120V and the insulation impedance detection is normal, the photovoltaic device meets the preset power generation condition. The insulation impedance detection is used for detecting whether the insulation degree between the positive electrode and the negative electrode of the output end of the photovoltaic device and the ground is qualified or not.

In step 330, the bidirectional inverter is controlled to enter the operating state.

It should be noted that the photovoltaic device is connected to the bidirectional inverter through the DC-DC converter and the DC bus.

In step 340, it is determined whether the indoor unit of the air conditioning device receives a startup instruction. If the indoor unit of the air conditioning device receives the startup instruction, step 330 is executed. Otherwise, step 350 is performed.

In step 350, the bidirectional inverter is controlled to be in a non-operating state. In this case, the air conditioning device is connected to the bidirectional inverter via a DC bus.

Figure 4:
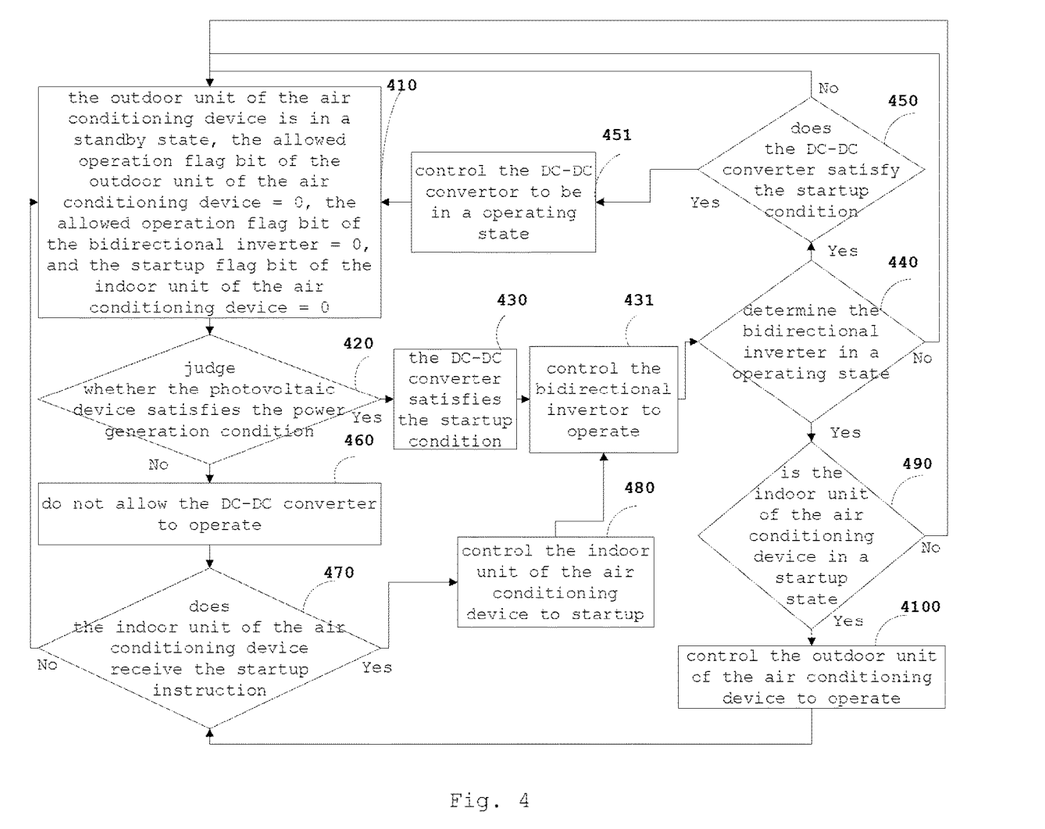
FIG. 4 is a schematic flow diagram illustrating another embodiment of a startup method of a photovoltaic air conditioning system according to the present disclosure.

FIG. 4 is a schematic flow diagram illustrating another embodiment of a startup method of a photovoltaic air conditioning system according to the present disclosure.

In step 410, an operation flag bit of the outdoor unit of the air conditioning device, an operation flag bit of the bidirectional inverter and an startup flag bit of the indoor unit of the air conditioning device are all set to be 0 under a condition that the outdoor unit of the air conditioning device is in a standby state.

In step 420, it is determined whether the photovoltaic device satisfies a predetermined power generation condition. If the photovoltaic device meets the preset power generation condition, step 430 is performed. Otherwise, step 460 is performed.

In step 430, it is determined that the DC-DC converter satisfies a preset startup condition. And setting a startup flag of the DC-DC converter, namely setting the startup flag of the DC-DC converter to 1.

In step 431, the bidirectional inverter is controlled to enter the operating state. Namely, the operation flag bit of the bidirectional inverter is set to 1. In some embodiments, the controller sends a first control signal to the bidirectional inverter to activate the bidirectional inverter.

In step 440, it is determined whether the bidirectional inverter is in an operating state. If the bidirectional inverter is in the operating state, steps 450 and 490 are respectively executed. Otherwise, step 410 is performed.

The DC air conditioning device needs to obtain electric power from a DC bus. Therefore, if the air conditioning device needs to be put into an operating state, the bidirectional inverter must be in an operating state. That is, the parameters of the photovoltaic device indirectly affects the air conditioning device.

In step 450, it is determined whether the DC-DC converter satisfies a predetermined startup condition. That is, it is detected whether the startup flag of the DC-DC converter is 1. If the start flag is 1, step 451 is executed, otherwise, step 410 is executed.

In step 451, the DC-DC converter is controlled to be in an operating state. In some embodiments, the controller sends a second control signal to the DC-DC converter to startup the DC-DC converter.

The DC-DC converter connected to the photovoltaic device is allowed to operate, only when the bidirectional inverter connected to the DC air conditioning device is in an operating state, i.e. the relevant parameters of the air conditioning device functions in the startup of the photovoltaic system.

In step 460, the DC-DC converter is not allowed to operate, i.e., the startup flag of the DC-DC converter is set to 0.

In step 470, it is determined whether the indoor unit of the air conditioning device receives a startup instruction. If the indoor unit of the air conditioner receives the startup instruction, step 480 is executed, otherwise, step 410 is executed.

In step 480, the indoor unit of the air conditioning device is controlled to enter the power on state, and the startup flag of the indoor unit of the air conditioning device is set to 1. Step 431 is subsequently performed.

In step 490, it is determined whether the indoor unit of the air conditioning device is in an on state, that is, it is determined whether the power on flag bit of the indoor unit of the air conditioning device is 1. If the indoor unit of the air conditioning device is in an on state, step 4100 is performed. Otherwise, step 410 is performed.

In step 4100, the outdoor unit of the air conditioning device is controlled to enter an operating state. Namely, the operation flag bit of the outdoor unit of the air conditioning device is set to 1. After indoor unit and the outdoor unit of the air conditioning device are operated, if the user turns off the indoor unit, the step 470 is continuously performed subsequently.

In the embodiment, parameters related to the photovoltaic device and parameters related to the air conditioning device are correlated and interacted, so that the stability and the reliability of the system are improved, and the service life of the system is prolonged.

Figure 5:
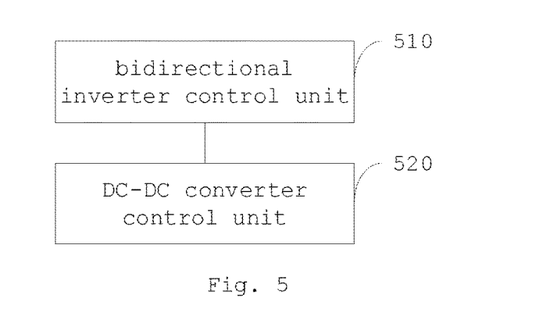
FIG. 5 is a schematic structural diagram of one embodiment of the controller according to the present disclosure.

FIG. 5 is a schematic structural diagram of one embodiment of the controller of the present disclosure. The controller includes a bidirectional inverter control unit 510 and a DC-DC converter control unit 520.

The bidirectional inverter control unit 510 is configured to control the bidirectional inverter to enter an operating state when the photovoltaic device satisfies a preset power generation condition.

For example, when the outdoor unit of the air conditioning device is in a standby state, the bidirectional inverter control unit 510 determines whether the electrical parameters of the photovoltaic device meet a preset power generation condition. And if the electrical parameters of the photovoltaic device meet the preset power generation conditions, a startup identifier of the DC-DC converter is set, and the bidirectional inverter is controlled to enter an operating state. If the electrical parameters of the photovoltaic device do not meet the preset power generation condition, it is determined whether the indoor unit of the air conditioning device receives a startup command. And if the indoor unit of the air conditioning device receives the startup command, the indoor unit of the air conditioning device is controlled to enter an operating state and the bidirectional inverter is controlled to enter the operating state.

In some embodiments, the bidirectional inverter control unit 510 sends a first control signal to the bidirectional inverter to startup the bidirectional inverter.

The DC-DC converter control unit 520 is configured to control the DC-DC converter connected to the photovoltaic device to enter an operating state under a condition that the bidirectional inverter enters the operating state, so that the photovoltaic device supplies the electric power to the air conditioning device through the DC-DC converter.

In the controller provided by the above embodiment of the present disclosure, under the condition that the photovoltaic device meets the preset power generation condition, the bidirectional inverter is controlled to enter the operating state, and then the DC-DC converter connected to the photovoltaic device is controlled to enter the operating state, so that the system stability is improved.

Figure 6:
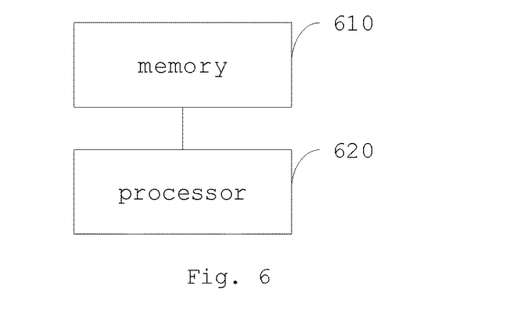
FIG. 6 is a schematic structural diagram of another embodiment of the controller according to the present disclosure.

FIG. 6 is a schematic structural diagram of another embodiment of the controller of the present disclosure. The controller includes a memory 610 and a processor 620, wherein the memory 610 may be a magnetic disk, a flash memory, or any other non-volatile storage medium. The memory is used for storing instructions in the embodiments corresponding to FIGS. 1, 3 and 4. The processor 620 is coupled to memory 610, and may be implemented as one or more integrated circuits, such as a microprocessor or a microcontroller. The processor 620 is configured to execute instructions stored in the memory.

Figure 7:
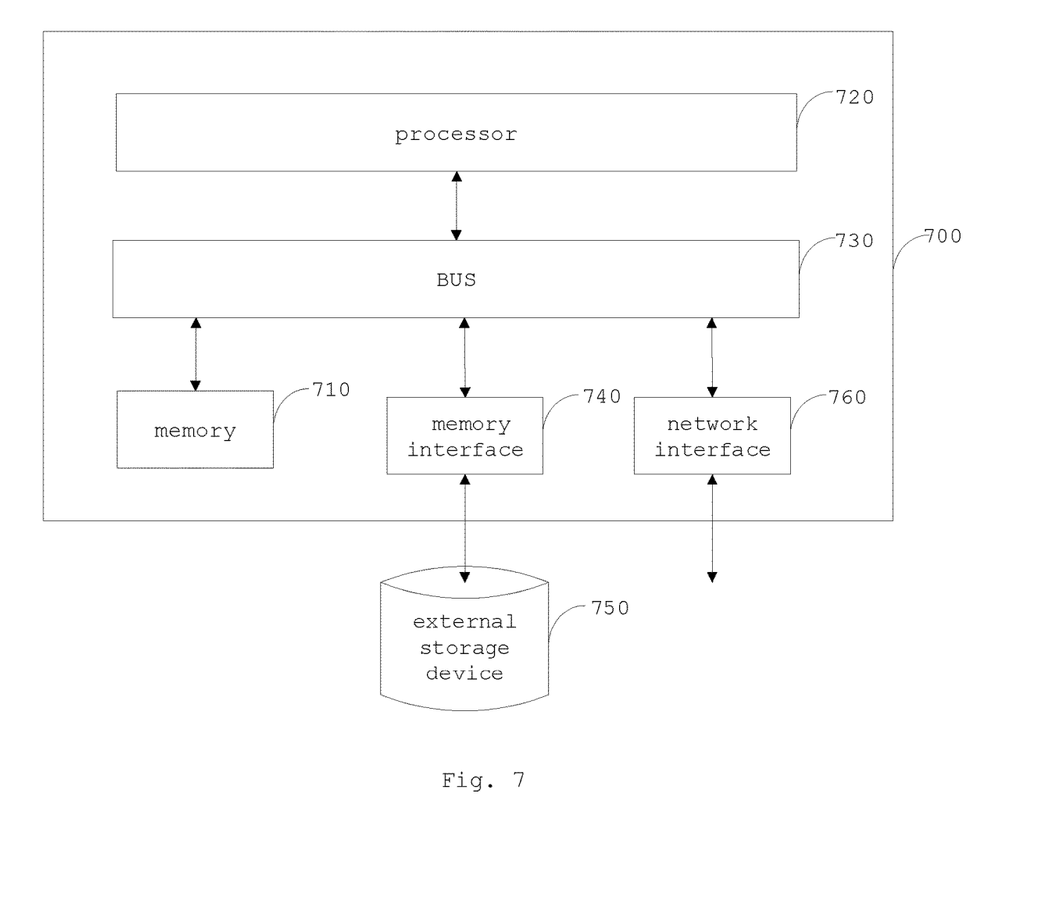
FIG. 7 is a schematic structural diagram of another embodiment of the controller according to the present disclosure.

FIG. 7 is a schematic structural diagram of another embodiment of the controller of the present disclosure.

As shown in FIG. 7, the controller 700 includes a memory 710 and a processor 720. The processor 720 is coupled to the memory 710 by the BUS 730. The controller 700 may also be connected to an external storage device 750 via a storage interface 740 for retrieving external data, and may also be connected to a network or another computer system (not shown) via a network interface 760, which will not be described in detail herein.

In the embodiment, data instructions are stored by the memory and processed by the processor, so that the stability of the system is improved.

In further embodiments, a computer-readable storage medium has stored thereon computer program instructions which, when executed by a processor, implement the steps of the method in the embodiments corresponding to FIGS. 1, 3 and 4. As will be appreciated by those skilled in the art, embodiments of the present disclosure may be provided as a method, apparatus, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-usable non-transitory storage media (including, but not limited to, disk storage, CD-ROM, optical storage, and so forth) having computer-usable program code embodied therein.

The present disclosure is described with reference to flowchart illustrations and/or block diagrams of methods, apparatus (systems) and computer program products according to embodiments of the disclosure. It will be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

Thus far, the present disclosure has been described in detail . Some details well known in the art have not been described in order to avoid obscuring the concepts of the present disclosure. Those skilled in the art can now fully appreciate how to implement the teachings disclosed herein, in view of the foregoing description.

Although some specific embodiments of the present disclosure have been described in detail by way of example, it should be understood by those skilled in the art that the above examples are for illustration only and are not intended to limit the scope of the present disclosure. It will be appreciated by those skilled in the art that modifications can be made to the above embodiments without departing from the scope and spirit of the present disclosure. The scope of the present disclosure is defined by the appended claims.

What is claimed is:

1. A startup method of a photovoltaic air conditioning system, comprising:
   determining whether electrical parameters of a photovoltaic device meet a preset power generation condition in response to that an outdoor unit of the air conditioning device is in a standby state;
   setting a startup identifier of a direct current-direct current converter and controlling a bidirectional inverter to enter an operating state in response to that the electrical parameters of the photovoltaic device meet the preset power generation condition; and
   controlling the direct current-direct current converter connected with the photovoltaic device to enter an operating state to transmit electric power from the photovoltaic device to an air conditioning device in the photovoltaic air conditioning system in response to that the bidirectional inverter enters the operating state.

2. The startup method according to claim 1, wherein the controlling the bidirectional inverter to enter the operating state in response to that the photovoltaic device meets the preset power generation condition further comprises:
   determining whether an indoor unit of the air conditioning device receives a startup instruction in response to that the electrical parameters of the photovoltaic device do not meet the preset power generation condition; and
   controlling the indoor unit of the air conditioning device to enter an operating state and controlling the bidirectional inverter to enter the operating state in response to that the indoor unit of the air conditioning device receives the startup instruction.

3. The startup method according to claim 1, wherein the controlling the bidirectional inverter to enter the operating state comprises:
   sending a first control signal to the bidirectional inverter to start up the bidirectional inverter.

4. The startup method according to claim 1, wherein the controlling the direct current-direct current converter connected with the photovoltaic device to enter the operating state in response to that the bidirectional inverter enters the operating state comprises:

detecting whether there is a startup identifier of the direct current-direct current converter in response to that the bidirectional inverter enters the operating state; and controlling the direct current-direct current converter to enter the operating state in response to that there is a startup identifier of the direct current-direct current converter.

5. The startup method according to claim 4, further comprising:

determining whether an indoor unit of the air conditioning device is in a startup state after the bidirectional invelier enters the operating state; and controlling the outdoor unit of the air conditioning device to enter the operating state in response to that the indoor unit of the air conditioning device is in a startup state.

6. The startup method according to claim 4, wherein the controlling the direct current-direct current converter to enter the operating state comprises:

sending a second control signal to the direct current-direct current converter to start up the direct current-direct current converter.

7. The startup method according to claim 1, wherein the preset power generation condition comprises that an output voltage of the photovoltaic device is larger than a voltage threshold value, and an insulation impedance of the photovoltaic device is larger than an impedance threshold value.

8. A controller, comprising:

a bidirectional inverter control unit, configured to determine whether electrical parameters of a photovoltaic device meet a preset power generation condition in response to that an outdoor unit of an air conditioning device is in a standby state, set a startup identifier of a direct current-direct current converter and control the bidirectional inverter to enter an operating state in response to that the electrical parameters of the photovoltaic device meet the preset power generation condition; and a direct current-direct current converter control unit, configured to control the direct current-direct current converter connected with the photovoltaic device to enter an operating state in response to that the bidirectional inverter enters the operating state to transmit electric power from the photovoltaic device to an air conditioning device in a photovoltaic air conditioning system in response to that the bidirectional inverter enters the operating state.

9. The controller of claim 8, wherein the preset power generation condition comprises that an output voltage of the photovoltaic device is larger than a voltage threshold value, and an insulation impedance of the photovoltaic device is larger than an impedance threshold value.

10. A controller, comprising:

a processor; and a memory coupled to the processor, storing program instructions which, when executed by the processor, cause the processor to:

determine whether electrical parameters of a photovoltaic device meet a preset power generation condition in response to that an outdoor unit of an air conditioning device is in a standby state;

set a startup identifier of a direct current-direct current converter and control a bidirectional inverter to enter an operating state in response to that the electrical parameters of the photovoltaic device meet the preset power generation condition; and control the direct current-direct current converter connected with the photovoltaic device to enter an operating state to transmit electric power from the photovoltaic device to an air conditioning device in a photovoltaic air conditioning system in response to that the bidirectional inverter enters the operating state.

11. A photovoltaic air conditioning system, comprising:

a controller of claim 10;

a photovoltaic device;

a direct current-direct current converter and a bidirectional inverter connected with a direct current bus, wherein the direct current-direct current converter is configured to convert a direct current power output by the photovoltaic device into a direct current power transmitted on the direct current bus and send electrical parameters to the controller;

an outdoor unit of the air conditioning device, configured to receive electric power from the direct current bus and send a state of the outdoor unit to the controller; and an indoor unit of the air conditioning device, configured to receive electric power from the direct current bus or receive electric power from an alternating current power supply through the bidirectional inverter and send the state of the indoor unit to the controller.

12. A non-transitory computer readable storage medium having stored thereon computer program instructions which, when executed by a processor, implement the startup method of a photovoltaic air conditioning system of claim 1.

13. The controller according to claim 10, wherein the instructions further cause the processor to:

determine whether an indoor unit of the air conditioning device receives a startup instruction in response to that the electrical parameters of the photovoltaic device do not meet the preset power generation condition; and control the indoor unit of the air conditioning device to enter an operating state and control the bidirectional inverter to enter the operating state in response to that the indoor unit of the air conditioning device receives the startup instruction.

14. The controller according to claim 10, wherein the instructions further cause the processor to:

send a first control signal to the bidirectional inverter to start up the bidirectional inverter.

15. The controller according to claim 10, wherein the instructions further cause the processor to:

detect whether there is a startup identifier of the direct current-direct current converter in response to that the bidirectional inverter enters the operating state; and control the direct current-direct current converter to enter the operating state in response to that there is a startup identifier of the direct current-direct current converter.

16. The controller according to claim 15, wherein the instructions further cause the processor to:

determine whether an indoor unit of the air conditioning device is in a startup state after the bidirectional inverter enters the operating state; and control an outdoor unit of the air conditioning device to enter the operating state in response to that the indoor unit of the air conditioning device is in a startup state.

17. The controller according to claim 15, wherein the instructions further cause the processor to:

send a second control signal to the direct current-direct current converter to start up the direct current - direct current converter.

18. The controller according to claim 10, wherein the preset power generation condition comprises that an output voltage of the photovoltaic device is larger than a voltage threshold value, and an insulation impedance of the photovoltaic device is larger than an impedance threshold value.

* * * * *